US012629920B2

(12) United States Patent
Hossain et al.

(10) Patent No.: US 12,629,920 B2
(45) Date of Patent: May 19, 2026

(54) POLYMERIC FABRIC

(71) Applicant: Sefar AG, Heiden (CH)

(72) Inventors: Mohammad Mokbul Hossain, Heiden (CH); Christoph Ellenberger, Kriessern (CH)

(73) Assignee: Sefar AG, Heiden (CH)

( * ) Notice: Subject to any disclaimer, the term of this patent is extended or adjusted under 35 U.S.C. 154(b) by 511 days.

(21) Appl. No.: 18/052,472

(22) Filed: Nov. 3, 2022

(65) Prior Publication Data

US 2023/0136835 A1 May 4, 2023

(30) Foreign Application Priority Data

Nov. 4, 2021 (EP) ..................................... 21206475

(51) Int. Cl.
| | |
|---|---|
| *B32B 7/02* | (2019.01) |
| *C09D 201/02* | (2006.01) |
| *D06M 15/256* | (2006.01) |

(52) U.S. Cl.
CPC .............. *B32B 7/02* (2013.01); *C09D 201/02* (2013.01); *D06M 15/256* (2013.01); *B32B 2250/40* (2013.01); *B32B 2255/26* (2013.01); *B32B 2262/02* (2013.01); *B32B 2262/148* (2021.05); *B32B 2307/73* (2013.01); *D06M 2200/11* (2013.01); *D06M 2200/12* (2013.01); *D10B 2321/042* (2013.01); *D10B 2401/021* (2013.01); *D10B 2501/04* (2013.01)

(58) Field of Classification Search
None
See application file for complete search history.

(56) References Cited

U.S. PATENT DOCUMENTS

| | | | |
|---|---|---|---|
| 6,582,823 B1 | 6/2003 | Sakhrani et al. | |
| 2015/0191868 A1 | 7/2015 | Lee et al. | |
| 2015/0240354 A1 | 8/2015 | Han et al. | |
| 2021/0214887 A1* | 7/2021 | Hussey | .................. D06M 14/26 |
| 2023/0313444 A1* | 10/2023 | Zong | .................... C23C 16/0245 |
| | | | 428/447 |

FOREIGN PATENT DOCUMENTS

| | | |
|---|---|---|
| EP | 4 190 940 A1 | 6/2023 |
| KR | 10-2015-0081177 A | 7/2015 |
| KR | 10-2017-0129719 A | 11/2017 |

(Continued)

OTHER PUBLICATIONS

English translation of JP 6715855 (Year: 2020).*

(Continued)

*Primary Examiner* — Ronak C Patel
(74) *Attorney, Agent, or Firm* — Studebaker Brackett PLLC

(57) ABSTRACT

The invention relates to a polymeric fabric comprising an outer functional layer having hydrophobic and oleophobic characteristics made of a first compound, and a second functional layer having hydrophobic characteristics made of a second compound, wherein the first and the second compound differ from each other. Further the outer functional layer at least partly coats the second layer. Additionally, the invention relates to a method of producing a polymeric fabric and an apparatus for producing a polymeric fabric.

14 Claims, 3 Drawing Sheets

(56)                 References Cited

FOREIGN PATENT DOCUMENTS

Figure 1:
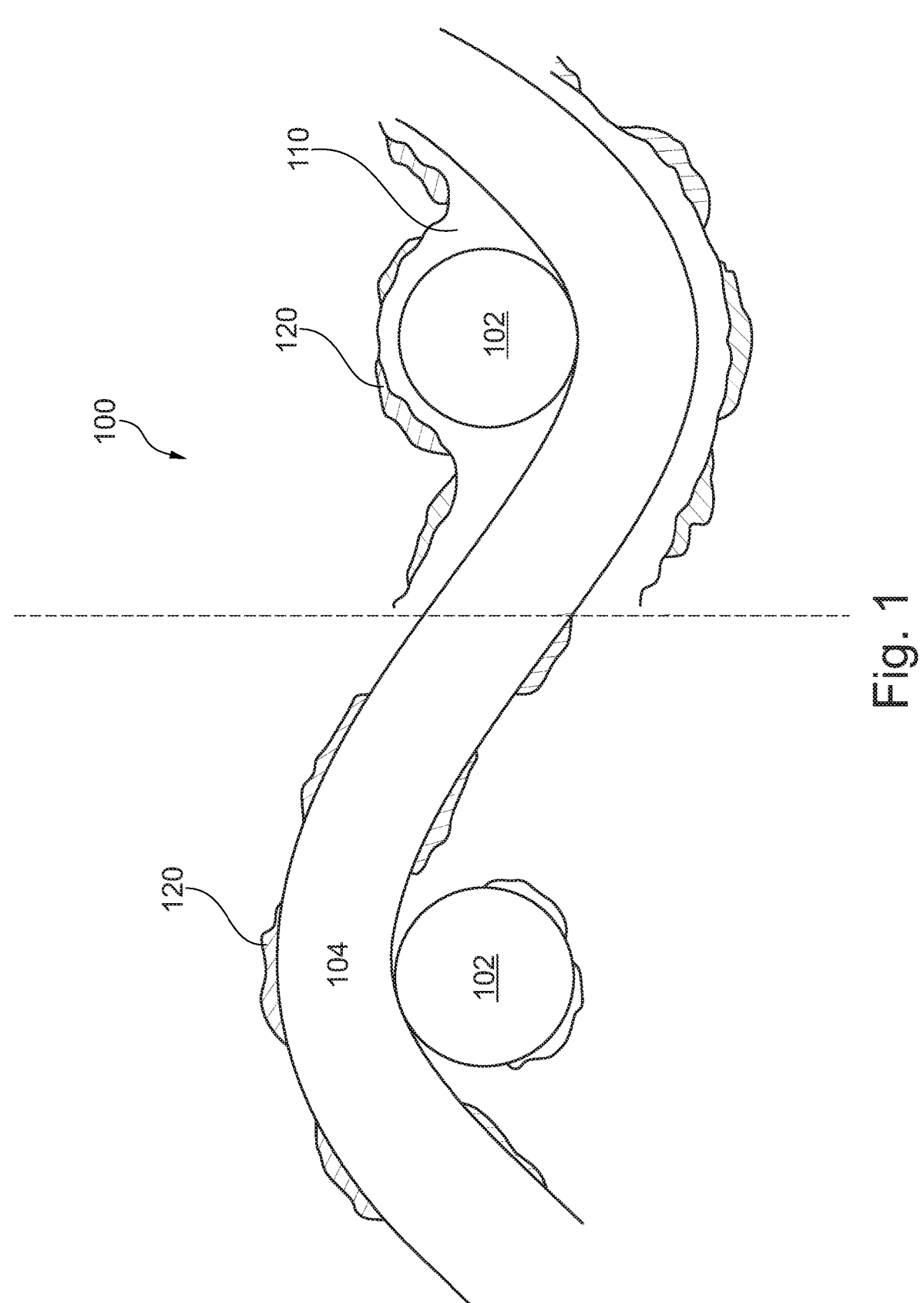

| WO | 2006/131081 | A1 |   | 12/2006 | | |
| WO | 2008/106903 | A2 |   | 9/2008 | | |
| WO | WO-2009065664 | A1 | * | 5/2009 | .......... | C08G 77/382 |
| WO | 2017/129418 | A1 |   | 8/2017 | | |
| WO | 2022/028412 | A1 |   | 2/2022 | | |

OTHER PUBLICATIONS

English translation of Chen et al. (CN 103724610) (Year: 2014).*
English translation of Zong et al. (WO 2022/028412) (Year: 2022).*
An Office Action mailed by the Korean Intellectual Property Office on Jan. 10, 2025, which corresponds to Korean Patent Application No. 10-2022-0146107 and is related to U.S. Appl. No. 18/052,472.
The extended European search report issued by the European Patent Office on Apr. 29, 2022, which corresponds to European Patent Application No. 212064752-1107.
Zille, Andrea et al., Plasma Treatment in Textile Industry, Plasma Process and Polymers, vol. 12, No. 2, Aug. 25, 2014, pp. 98-131.
An Office Action mailed by the Japanese Patent Office on Nov. 28, 2023, which corresponds to Japanese Patent Application No. 2022-172035 and is related to U.S. Appl. No. 18/052,472; with English language translation.
An Office Action mailed by China National Intellectual Property Administration on Jun. 27, 2025, which corresponds to Chinese Patent Application No. 202211375623.8 and is related to U.S. Appl. No. 18/052,472.
Communication pursuant to Article 94(3) EPC issued by the European Patent Office on May 30, 2025, which corresponds to European Patent Application No. 21206475.2-1102 and is related to U.S. Appl. No. 18/052,472.

* cited by examiner sandwich arrangement hybrid arrangement membrane fleece carrier layer single layer multilayer

POLYMERIC FABRIC

The invention relates to a polymeric fabric having hydrophobic and oleophobic characteristics and to a method of producing a polymeric fabric having hydrophobic and oleophobic characteristics. Furthermore, the invention relates to an apparatus for producing a polymeric fabric.

There is a high demand in microfiltration applications for protection of ventilated premises, equipment and accessories. One of the challenges here is to prevent harmful liquids, particles to the inside of a ventilated premises. Thus, liquid repellent coatings have become frequently used in many sectors due to their ability to repel a broad range of liquids ranging from high surface tension liquids such as water to low surface tension oils.

Traditionally, long molecular chain e.g. C8 fluorocarbon (FC) compounds are used for coating to protect personnel not only from warfare agents, but also from everyday substances such as water, oils, fuel, lubricants, cleaning solvents, and other contaminants. However, due to their potential high toxicity, legislation has been put in place to restrict or ban their usage throughout the world. Alternative coatings have been developed and brought into market. In particular, short chain C6 fluorochemical coatings have come close in performance to traditional C8 based FC coatings without the high environmental risk.

The use of C6 FC based still has resulted in global environmental contamination because it contains traces of perfluorooctanoic acid (PFOA) and its salts and concern has been raised because of the persistence and potential for bioaccumulation of these substances. Moreover, the new REACH regulation (EU/784/2020) which is effective from 3 Dec. 2020 allows to keep the PFOA threshold value under 25 ppb (parts per billion). Therefore, a general trend is to avoid these chemistries for health reasons. Moreover, there is still demand for next generation super hydro- and oleophobic coating with high degree of repellency against oils and fats.

Hexamethyldisiloxane (HMDSO) is one choice of industries as alternative to C6 FC because it is a non-toxic material and no harmful materials are produced during processing. It is widely used as precursor monomer for plasma processes due to its suitable vapor pressure. Carbon-rich, plasma polymerized HMDSO (pp-HMDSO) from pure HMDSO, shows promising mechanical properties such as low internal stress, good adhesion and excellent hydrophobic barrier performance. Although the water resistance provided by pp-HMDSO coating is promising, but it does not pose any oleophobic properties.

With advancing technological development in thin film technology, there is a continuing need to develop a chemical vapor deposition process to prepare thin films of permanent hydro- and oleophobic functional groups using ultra-short chain PFASs, which exhibit unique functional properties for filtration applications. The lack of the proper volatile precursors and the difficulty in composition control in coating are the major barriers to sluggish the achievement of this purpose.

It is therefore the object of the invention to provide a robust and reliable fabric having hydro- and oleophobic characteristics for hygienic and filtration applications such as water separation, acoustic, medical, healthcare, food, a methods for manufacturing the fabric and an apparatus for producing the polymeric fabric.

According to the invention the object is achieved on the one hand by a polymeric fabric having the features of claim 1 and by a method of producing a polymeric fabric having the features of claim 9 as well as an apparatus for producing a polymeric fabric having the features of claim 14.

Preferred embodiments of the invention are stated in the respective dependent claims.

The polymeric fabric according to the invention comprises an outer functional layer having hydrophobic and oleophobic characteristics made of a first compound and a second functional layer having hydrophobic characteristics made of a second compound, wherein the first and the second compound differ from each other. Further the outer functional layer at least partly coats the second layer.

Furthermore, the method according to the invention for producing a polymeric fabric is characterized in that an outer functional layer providing hydrophobic and oleophobic characteristics is deposited on the polymeric fabric by means of low-pressure plasma coating technology, and that a second functional layer providing hydrophobic characteristics is deposited on the polymeric fabric by means of low-pressure plasma coating technology, wherein the outer functional layer and the second functional layer differ from each other, Additionally the second functional layer is deposited on the polymeric fabric before the outer functional layer is deposited on the polymeric fabric, and wherein the outer functional layer at least partly coats the second layer.

A basic idea of the invention resides in the fact to deviate for the state-of-the-art system of providing on layer on a fabric having all required characteristics or properties. Based on the invention two layers are provided above each other, wherein the layers differ from each other. Thereby it is possible to choose different layers having different characteristics. Thus, it is no longer required to find and use a material providing all required characteristics, but one may combine different materials for different layers so that the combination provides the required characteristics.

Preferably the second functional layer has no oleophobic characteristics. It thereby clearly differs to the outer functional layer which provides hydrophobic and oleophobic characteristics. However due to the fact, that these two layers are superposed each other e.g. the hydrophobic characteristics of the outer layer do not need to be at a very high level as below the second functional layer is provided also providing hydrophobic characteristics.

In an embodiment the outer functional layer is a plasma nanocoating which is based on per- and polyfluoroalkyl substances (PFAS) comprising only one, two or three C-atoms and/or based on perfluoropolyether compounds (PFPE). Further in another or a combined embodiment the second functional layer is a plasma nanocoating which is based on hexamethyldisiloxane (HMDSO) or a diamond-like-carbon (DLC) layer.

As explained above the use of short molecular chain C6 fluorocarbon (FC) compounds is problematic and even not allowed in some region anymore. The straightforward step to replace the later by ultrashort chain C3 to C1 fluorocarbon (FC) like per- and polyfluoroalkyl substances (PFAS) seems on the first sight a promising solution. However, even though these compounds in principle provide hydrophobic and oleophobic characteristics, it was realized that when using plasma nanocoating to deposit them on the fabric problems arise. During the process of plasma polymer coating the thickness of a PFAS based C3 to C1 fluorocarbon (FC) layer is very thin compared to the previous C6 to C8 based fluorocarbon (FC) layer. Hence the layer especially provided on a fabric, e.g. a woven fabric, only provides an insufficient layer and therefore improvable hydrophobic characteristics. Surprisingly it was realised that even the thinner layer provides good oleophobic characteristics.

This observation was also made when analysing a layer which was created by a process of plasma polymer coating based on perfluoropolyether compounds (PFPE). However, the benefit of perfluoropolyether compounds compared to plasma nanocoating which is based on per- and polyfluoroalkyl substances (PFAS) comprising only one, two or three C-atoms is that perfluoropolyether compounds (PFPE) are even more environmentally friendly.

Based on the inventions the outer functional layer is a plasma nanocoating which is based on per- and polyfluoroalkyl substances (PFAS) comprising only one, two or three C-atoms and/or based on perfluoropolyether compounds (PFPE) is provided on a second functional layer having hydrophobic characteristics. Hence the improvable hydrophobic characteristics of the outer functional layer can be improved by the inventive second functional layer. In other words, first a layer having good hydrophobic characteristics is deposited on the fabric and the in a second further step the outer functional layer having hydrophobic and oleophobic characteristics is deposited on the fabric already covered by the second functional layer. Due to this construction the fabric is provided with excellent hydrophobic and oleophobic characteristics.

The second functional layer can be based on hexamethyldisiloxane (HMDSO) or a diamond-like-carbon (DLC) layer. Using plasma polymer coating the second functional layer thereby can be formed as a pp-HMDSO base coating i.e. poly (dimethylsiloxane)-like (PDMS-like) coating, a fluorine-doped pp-HMDSO coating and/or a fluorine-doped DLC coating. These coating when deposited by plasma polymer technology, have sufficient good deposition rates to create a thicker layer that the previously mentioned outer functional layer. Hence due to the combination of these two layers technologies excellent hydrophobic and oleophobic characteristics can be provided to a polymeric fabric by polymer plasma coating.

Preferred the outer functional layer and/or the second functional layer is/are deposited by means of low-pressure plasma coating technology. This technology is also known as plasma enhanced chemical vapour deposition (PECVD) method. It is used a cold plasma. Hence the technology is suitable for temperature sensitive polymeric materials such as monofilament mesh, composite membranes. Using PECVD highly cross-linked polymer network having functional groups incorporated into the network can be deposited, thus a high long-term stability of the modified surface can be obtained.

In general, the polymeric fabric can be any kind of fabric. In one embodiment the polymeric fabric comprises a woven carrier layer, woven of a first and a second monofilament yarn, wherein the first and the second monofilament yarn are produced of the same or of different polymer materials. Monofilament yarn provide are particularly suitable of the proposed plasma-based deposition process.

To improve the filter properties of the polymeric fabric the polymeric fabric may comprises a composite membrane comprising at least a woven carrier layer and an electrospun membrane layer. The electrospun membrane layer may have a pore size between 0.20 μm and 2.0 μm. The membrane layer may be directly spun onto the woven carrier layer or spun onto a substrate and later transferred to the woven carrier layer during bonding process.

As explained the thickness of the outer functional layer is smaller than the second functional layer. Excellent hydrophobic and oleophobic characteristics can be achieved by if ratio of the thickness of the second functional layer to the thickness of outer functional layer is about 2:1, 3:1 or larger.

For example, the second functional may have a layer thickness of 20 to 300 nm and outer functional layer may have a layer thickness of preferably 10 to 150 nm.

According to the inventive method for producing a polymeric fabric an outer functional layer providing hydrophobic and oleophobic characteristics is deposited on the polymeric fabric by means of low-pressure plasma coating technology, and a second functional layer providing hydrophobic characteristics is deposited on the polymeric fabric by means of low-pressure plasma coating technology, wherein the outer functional layer and the second functional layer differ from each other, Additionally the second functional layer is deposited on the polymeric fabric before the outer functional layer is deposited on the polymeric fabric, and wherein the outer functional layer at least partly coats the second layer.

On central idea of the invention is to provide two different layers one superimposing the other at least partly. Thereby the characteristics of the outer functional layer can be supported by the characteristics of the second functional layer. So, an excellent result i.e. regarding providing a polymeric fabric with hydrophobic and oleophobic characteristics can be achieved with the need of using only one compound having all required characteristics. This is especially relevant if the outer functional layer based on per- and polyfluoroalkyl substances (PFAS) comprising only one, two or three C-atoms and/or based on perfluoropolyether compounds (PFPE) which are more environmentally friendly the previously used compounds but provided comparable less good hydrophobic and oleophobic characteristics.

To improve adhesion with the second functional layer a pre-treatment of the polymeric fabric can be performed prior to the deposition of the second functional layer by means of low pressure plasma technology using nonpolymerizable gases like argon, helium, nitrogen, oxygen, and tetrafluoromethane gases and/or a gaseous mixture thereof.

Additionally or alternatively prior to the deposition of the second functional layer a two-step pre-treatment of polymeric fabric can be performed, wherein in a first step the polymeric fabric is coated with UV curable imprint resin using gravure and/or slot die coating method and in a second step a surface patterning is performed using UV imprinting and/or hot embossing method.

Finally, in addition or as alternative to the previously explained pre-treatments prior to the deposition of the second functional layer a pre-treatment of the polymeric fabric can be performed, wherein the polymeric fabric is treated with an aqueous solution comprising sodium hydroxide (NaOH).

Due to the pre-treatments the surface of the fabric can be chemically and/or morphologically modified prior to the deposition of functional layer, as a result the plasma-polymer can adhere particularly firmly to the substrate during plasma polymerization. Further also surface structuring for improved roll-off effect, so-called lotus effect can be realised via nanoimprinting and plasma pre-treatment. By one of the pre-treatments or a combination of them a cleaning, activation and/or texturing of the polymeric fabric is achieved so that the adhesion of the second functional layer can be increased. Based on the invention a pre-processing or cleaning of the fabric is not consider creating a layer on the fabric.

Based on an improved embodiment the outer functional layer and/or second functional layer is/are deposited in one processing step in one process to obtain fluorine-doped HMDSO plasma nanocoating and/or fluorine-doped DLC plasma nanocoating.

Based on the invention a polymeric fabric can be provided which resistance against water and oil repellency is increased, and/or contact angle with water, diiodmethane and pentandiol from 110° to 150° and oil grade of 5 to 8 according to AATCC 118, are provided.

An inventive apparatus for producing an inventive polymeric fabric comprises a low-pressure plasma coating device being adapted to deposit an outer functional layer on the polymeric fabric providing hydrophobic and oleophobic characteristics by means of low-pressure plasma coating technology, to deposit a second functional layer on the polymeric fabric providing hydrophobic characteristics by means of low-pressure plasma coating technology, wherein the outer functional layer and the second functional layer differ from each other, and to first deposit the second functional layer on the polymeric fabric and then deposit the outer functional layer on the polymeric fabric, wherein the outer functional layer at least partly coats the second layer.

Figures 2, 3, 4, 5:
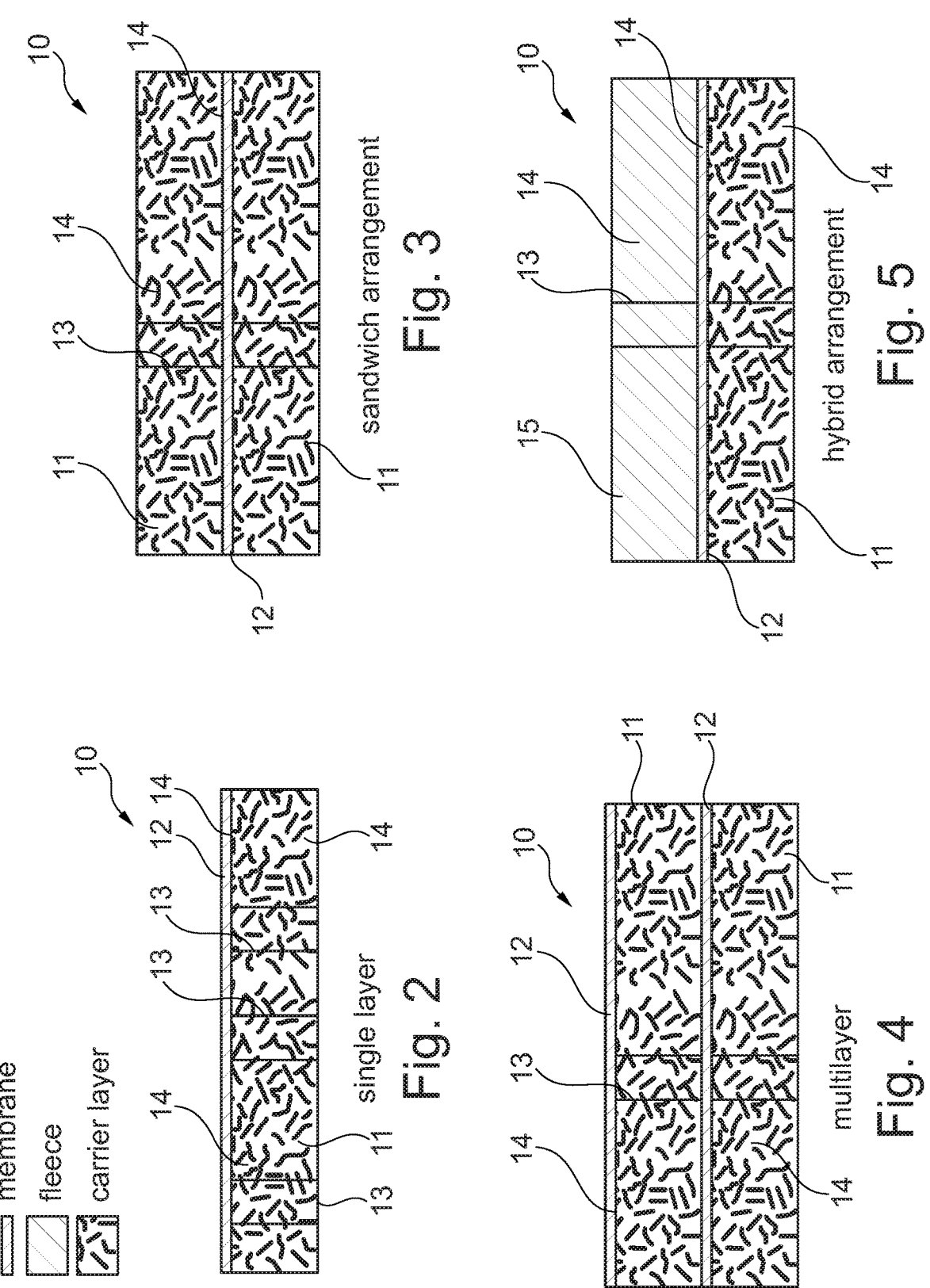
Figure 6:
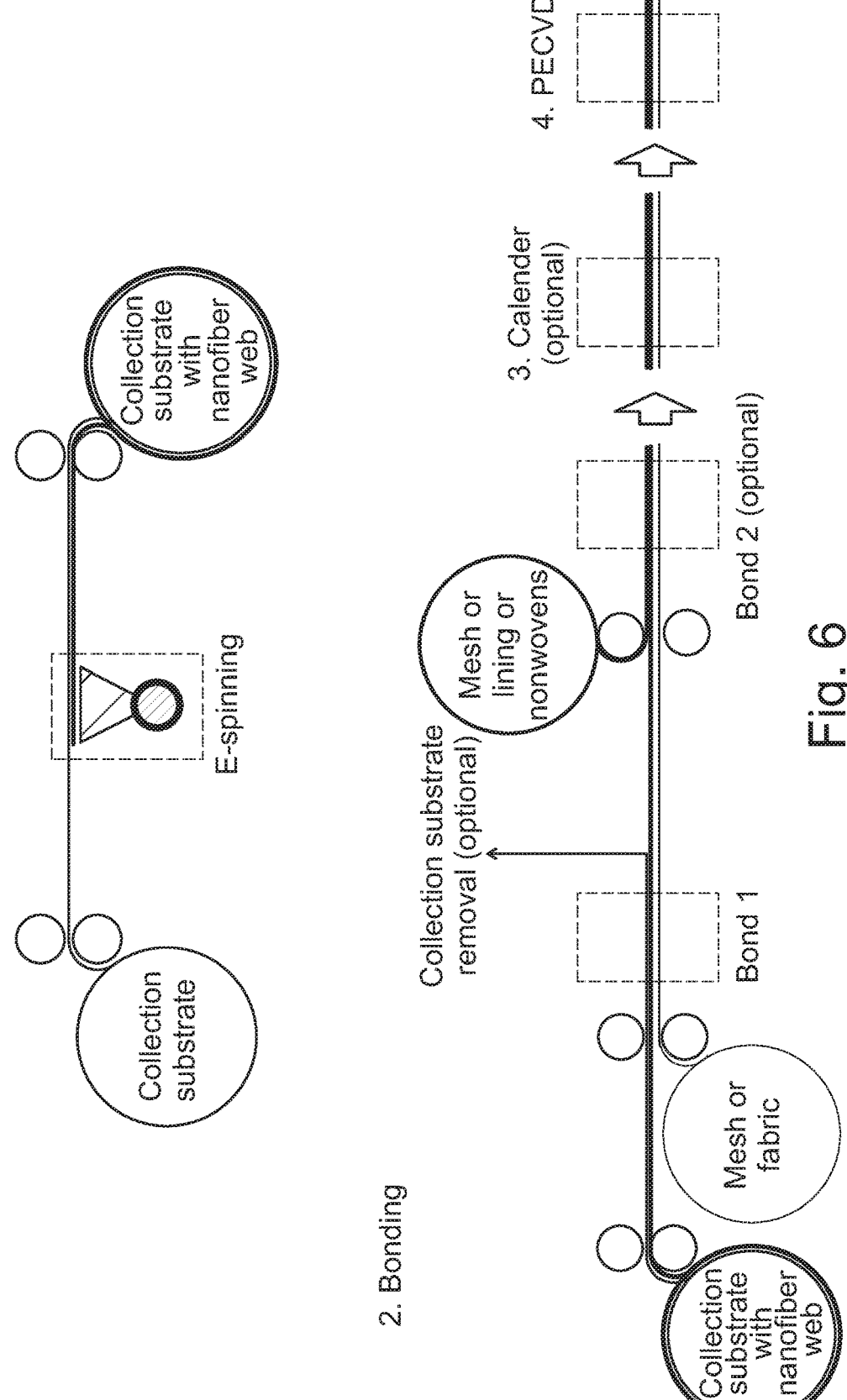

In the following the invention is described further by way of a preferred exemplary embodiment illustrated schematically in the accompanying drawings, wherein show:

FIG. 1 a schematic drawing of a polymeric fabric;

FIG. 2 a schematic cross-sectional illustration of a polymeric fabric according to the invention comprising a membrane ("single layer");

FIG. 3 a schematic cross-sectional illustration of the composite according to the invention in the so-called "sandwich" arrangement;

FIG. 4 a schematic cross-sectional illustration of the composite according to the invention with a multilayer structure ("multilayer");

FIG. 5 a schematic cross-sectional illustration of the composite according to the invention in a "hybrid" arrangement with two different carrier layers; and FIG. 6 a schematic drawing of a method to produce an inventive polymeric fabric;

FIG. 1 shows a strongly schematized view of a polymer fabric 100. On the left side of the figure, the polymer fabric 100 is only provided with an outer functional layer 120, wherein on the right side, in addition to the outer functional layer 120 a second functional layer 110 is provided. In the following, based on this example, the inventive concept will be further explained.

In FIG. 1, a highly enlarged schematized view of the polymeric fabric 100 is shown, wherein two weft threads 102 and one warp thread 104 are presented.

If, as shown on the left side, only a first polymer deposition based on a PFAS comprising 1 to 3 C-atoms would be provided, due to the suboptimal deposition rate of this compound, the layer will not totally cover the yarns. This can especially be seen in the contact region of the left weft 102 and warp threads 104. The same result occurs if instead of a PFAS comprising 1 to 3 C-atoms first polymer deposition based on a PFPE would be provided.

In opposite thereto, in addition to the outer functional layer 120, a second functional layer 110—for example based on HMDSO—is provided to ensure that the fabric 100 is fully covered by the second functional layer 110 before the outer functional layer 120 is provided. On the one hand a better deposition of the outer functional layer 120 can be achieved and on the other hand even if regions would not be covered by the outer functional layer 120, they are at least covered by the second functional layer 110. As alternates to HMDSO second functional layer 110, this layer could also be based on F-doped HMDSO, DLC, F-doped DLC, or a combination thereof.

FIG. 2 shows a cross-sectional view of a polymeric fabric here as a composite 10 with a carrier layer 11. On the carrier layer 11 *a* membrane 12 is arranged that is formed according to the electrospinning method and applied onto the carrier layer 11. For an improved adherence of the membrane 12 to the carrier layer 11 the composite can be designed with at least one joining point 13 that firmly joins both layers to each other.

This can be a melted or adhesive bonding location in the form of dots or lines. Due to the small layer thicknesses of the carrier material 11 and the membrane 12 the composite can be penetrated completely by the joining point 13 at the joining location.

The composite 10, more particularly the electrospun membrane 12, can be formed with a porosity. The surface of the composite 10 and the fibers of the pores can be coated with a coating that is applied according to an inventive two step plasma coating method as explained with reference to FIG. 1. Thereby a first plasma coating of pp-HMDSO or DLC is applied to provide hydrophobic characteristics only. Following a further plasma coating is applied providing a layer based on PFAS comprising only one, two or three C-atoms and/or based on PFPE, providing hydrophobic and oleophobic characteristics. The outer functional layer and second functional layer can also be deposited in one plasma processing step to obtain a fluorine-doped HMDSO or a fluorine-doped DLC layer providing hydro- and oleophobic properties. Optionally F-doped HMDSO or F-doped DLC can also be used as second functional layer.

The surface coatings of the fibers are illustrated schematically as a whole in the Figures by the depicted dots and lines 14. The coatings can also coat fibers in a region in the pores of the membrane 12, which is positioned internally or deeper in the composite 10. Hence, not only the macroscopic external surface of the composite can be coated but also the microscopic internal surface, i.e. for instance fibers, recesses, and uneven parts, in which case the single fibers are enveloped or surrounded individually.

FIG. 3 shows a further composite 10 in a so-called "sandwich" arrangement. In this, the membrane 12 is arranged between two carrier layers 11, whereby the membrane 12 is protected between the layers against mechanical stress in particular. In an embodiment of the sandwich arrangement an air permeability of 15.6 l/m² s @200 Pa could be attained for example. Basically, an air permeability of up to 80 l/m²·s @200 Pa can also be reached with the sandwich, multilayer or hybrid arrangement.

In every possible arrangement of layers in a composite 10 these can be arranged on top of each other through simple lamination. However, the layers can also be firmly joined to each other by joining points 13, whereby a particularly reliable mechanical strength of the composite 10 can be attained.

In FIG. 4 a multilayer arrangement of the composite 10 (multilayer) is illustrated. In this arrangement carrier layers 11 and membrane layers 12 are provided such that they are supported on top of each other in an alternating manner. According to FIG. 4 two carrier layers 11 and two membrane layers 12 are provided. A multilayer arrangement can also have a random number of carrier layers 11 and/or membrane layers 12. It is also possible that, according to requirement, two membrane layers 12 are provided directly on top of each other between two or more carrier layers. Even in the case of a multilayer arrangement the inventive two step plasma coating can be provided on the microscopic surface of all membrane layers 12 and carrier layers 11 supported on top of each other. Thus, also in a multilayer structure the inventive two step plasma coating can be provided on internal surfaces of the composite 10.

FIG. 5 shows a variant a composite 10, in which the membrane 12 is arranged between a first carrier layer 11 and a second carrier layer 15. Basically, the first carrier layer 11 can be designed as a fabric in particular, whereas the second carrier layer 15 differs from the first carrier layer 11 and can be provided as a fleece in particular. By way of such a "hybrid" arrangement properties of different materials can be combined advantageously in the composite, whereby filter, protective properties and acoustic transmission properties can be realized in an advantageous manner in the composite 10. Also in a hybrid arrangement as shown in FIG. 5 the inventive two step plasma coating can be provided on the composite 10, in which case the plasma polymerizations for the second and the outer functional layer can also take place within the composite 10 in deeper layers such as within pore apertures.

The scheme of FIG. 6 shows an example for a manufacturing process for an inventive polymeric fabric like a composite comprising a carrier layer. A collection substrate (top picture) is provided on which the electrospinning membrane is formed (first production step). The electrospinning membrane is formed according to generally known concepts and further described in the following.

In a second step the formed a membrane is transferred and bonded (Bond 1) onto a carrier layer and the original collection substrate on which the electrospinning membrane has been formed can be optionally removed (collection substrate removal). According to the above provided to diagram the carrier layer can be a mesh or fabric.

Optionally their second bonding (Bond 2) can take place after introduction of the second outer layer followed by an optional calender process. Thus, the membrane can be optionally arranged between two equal or different layers forming a sandwich structure. The second outer layer can be provided for example as a mesh, lining or nonwoven material. Finally, the inventive two-step plasma coating is applied to at least one carrier layer and the membrane. Thereby first a layer providing hydrophobic characteristics only and a following layer providing hydrophobic and oleophobic characteristics are deposited. The first layer may be a pp-HMDSO, a fluorine doped HMDSO, a DLC or a fluorine doped DLC layer. The further, outer layer may be a layer based on PFAS comprising only one, two or three C-atoms and/or based on PFPE.

Electrospinning

The processes for making the nanofiber web are illustrated in WO 2006/131081, WO 2008/106903.

Briefly, in the electrospinning process a high voltage is used to create an electrically charged jet of polymer solution or melt out of the pipette. Before reaching the collecting screen, the solution jet evaporates or solidifies, and is collected as an interconnected web of small fibers. One electrode is placed into the spinning solution/melt and the other attached to the collector. In most cases, the collector is simply grounded. The electric field is subjected to the end of the capillary tube that contains the solution fluid held by its surface tension. This induces a charge on the surface of the liquid. Mutual charge repulsion and the contraction of the surface charges to the counter electrode cause a force directly opposite to the surface tension. As the intensity of the electric field is increased, the hemispherical surface of the fluid at the tip of the capillary tube elongates to form a conical shape known as the Taylor cone. Further increasing the electric field, a critical value is attained with which the repulsive electrostatic force overcomes the surface tension and the charged jet of the fluid is ejected from the tip of the Taylor cone. The discharged polymer solution jet undergoes an instability and elongation process, which allows the jet to become very long and thin. Meanwhile, the solvent evaporates, leaving behind a charged polymer fiber. In the case of the melt the discharged jet solidifies when it travels in the air.

Bonding Methods

There are different bonding techniques available. Hotmelt gravure lamination technology, ultrasonic bonding technology, dipping bonding technology, UFD fiberized spray technology (hotmelt) and spun-web bonding technology.

Hotmelt gravure lamination technology is industrially established for in line process. Thus, two steps bonding can also be done in one line for "sandwich" type membrane. It uses a multi-purpose hotmelt laminating and coating system which consists of a gravure roller for dot coating, a revolver dosing head (pos/pos or neg/neg) and application roller and a laminating roller and counter pressure roller.

The gravure roller is used to dot coating with adhesive, whereby two different reactive PU based adhesives (one for PU e-spinning membrane and the other for PA6 membrane) can be used. A high bond strength can be obtained by about 15-25% air permeability loss. The adhesive must be carefully chosen to avoid problems during end application of the membrane (conformity, physical & chemical suitability, medical & food grade etc.). A stiffening of the materials is observed because of adhesives.

The dipping bonding technology (chemical bonding) can be used for the pre-treatment of a carrier prior to the electrospinning process, which is sometimes preferable. Also, an additional process step for bonding can be eliminated, which is a major advantage. The two layers laminate can then be used for second bonding e.g. hotmelt, spun-web, UFD etc. to form a multilayer vent.

The UFD is a fiberized spray technology and the most advanced technology for hot melt adhesive applicators. The laminated plate technology (LPT) is applied to produce filament strands of adhesive. Heated air is used to elongate those strands and lay them down in random or ordered patterns. In many cases, by using UFD technology, one can cut adhesive usage by 20-50% without negatively influence the bond strength or durability by high precision application of adhesives. A non-contact mode is available which yields in less chance for damages of e-spun fibers during lamination. The UFD technology is a cleaner process than hotmelt gravure lamination.

The spun-web bonding technology yields rather a three-dimensional structure than a film with a closed surface. The open structure makes the resultant laminate more flexible and high air permeability. Webs are made of different materials: co-polyamide, co-polyester, co-polyolefins, polyurethanes etc. The spun-web technology is a very simple process. Three major parameters to be considered during lamination are temperature, pressure and time.

Calendering

Calendering is used on materials such as fabric, mesh, laminate vent to obtain a smoother and thinner material, whereby the material is passed between or under rollers at raised temperatures and pressures. The size and shape of the pores can be affected depending on the calendering conditions.

Plasma PECVD

The plasma treatment of textile materials can be applied as textile finishing process for technical and medical textiles as well as for composite materials to improve their surface properties like water and oil repellency. Compared to conventional wet-chemical textile finishing, plasma technology shows advantages regarding environmental issues. With the PECVD treatment, e.g. improvement of adhesion characteristics, increasing hydrophilicity, introducing special functional groups on the surface, or modifying the surface morphology can be obtained.

In plasma deposition, which is commonly known as plasma polymerization or PECVD, a very thin polymer layer (nano-scaled) can be deposited on the substrate surface. The layer is formed through polymerization of an organic precursor gas, which is directly polymerized on the substrate surface. In contrast to classic polymerization, plasma polymerization can use every monomer gas or vapor which is not limited to their reactivity. The plasma polymer shows unconventional polymerisation behavior with branched and randomly terminated chains and a high degree of crosslinking.

The bulk structure of plasma polymers is completely irregular, far from that of conventional polymers. Plasma polymer coating (nanothin film) differs from conventional polymer by a high density of functional groups per volume, a highly cross-linked and branched plasma polymer network, a nanometer thick coating (<200 nm), a high adhesion of coating to the substrate and a no change of bulk properties of the substrate, which can be a polymeric fabric.

According to the inventions the plasma treatment can be performed in a plasma chamber having a plurality of rollers and/or expanders in a roll to roll system which operates with a radiofrequency, preferably of about 13 MHz to 14 MHz, preferably of about 13.5 MHz or with a direct current (DC) power supply.

On mode to carry out the inventions may be that first a pre-treatment is performed for preferably of from about 2 minutes to about 5 minutes, at a base pressure, preferably of from about 70 mTorr to about 200 mTorr, at a temperature, preferably of from about 20° C. up to about 60° C., with a power output, preferably of from about 500 Watts to about 1800 Watts. Following the first coating step is performed for a period, preferably of from about 2 minutes to about 5 minutes, at a base pressure, preferably of from about 15 mTorr to about 150 mTorr, at a temperature, preferably of from about 20° C. up to about 60° C., with a power output, preferably of from about 100 Watts to about 1000 Watts. Then a second coating step is performed for a period, preferably of from about 2 minutes to about 5 minutes, at a base pressure, preferably of from about 15 mTorr to about 150 mTorr, at a temperature, preferably of from about 20° C. up to about 60° C., with a power output, preferably of from about 100 Watts to about 800 Watts to deposit the outer functional layer. In this embodiment the outer functional layer is based on C1-C3 based PFAS and the second functional layer is based on HMDSO or DLC.

EXAMPLE 1

A preferred embodiment of a filtration media based on a fabric according to the invention comprises a woven structure with different patterns to obtain maximum repellency and thus a super hydro- and oleophobic surface with contact angle more than 110° can be obtained, as can be seen in table 1. The degree of plasma-induced hydro- and oleophobization is also linked to the textile structure and the weave construction. The penetration of plasma species into the textile structure enables higher repellency. Thus, the hydro- and oleophobicity of substrate also depends on the arrangement of both weft and warp filament in fabric, the fineness of the ultimate filament, the fabric density and weave structure and the fiber content.

TABLE 1

| Comparative example contact angles of three liquids on coated polyester mesh (article # 3A07-0025-158-XX) | | | |
|---|---|---|---|
| Coating type | Water contact angle [°] (top/bottom) | Diiodmethane contact angle [°] (top/bottom) | Pentandiol contact angle [°] (top/bottom) |
| C3 based fluorinated functional coating | 132.2/129.1 | 111.4/112.3 | 131.3/129.1 |
| HMDSO based second functional coating and C3 based fluorinated outer functional coating | 134.7/134.2 | 116.3/117.4 | 133.8/132.7 |
| F-doped DLC coating | 129.5/129.0 | 111.0/110.2 | 125.8/125.5 |

EXAMPLE 2

The oil repellency of the treated polymeric fabric has been also evaluated in parallel according to AATCC 118 which is also a 'pass or fail' type of method that tests for oil liquid repellency instead of for aqueous liquids. AATCC 118 uses eight liquid hydrocarbons with decreasing surface tensions to determine oil repellency. The scale for the oils ranges from 0 (fail) using Kaydol, a mineral oil with a surface tension of 31.5 mN/m at 25° C., to 8 (highest oil repellency) using n-heptane, which has a surface tension of 19.8 mN/m at 25° C. The number assigned to the oil that does not wet the sample is taken as the repellency oil grade.

TABLE 2

| Comparative example spray test and oil drop test on coated polyester mesh (article # 3A07-0025-158-XX) | | | |
|---|---|---|---|
| Coating type | Spray test - water (ISO 4920) (grade 1-5) | Spray test - milk (ISO 4920) (grade 1-5) | Oil drop test (AATCC 118) (grade 1-8) |
| Standard C6 based fluorinated coating | 5 | 3 | 7 |
| C3 based fluorinated functional coating | 5 | 2 | 5 |
| HMDSO based second functional coating and C3 based fluorinated outer functional coating | 5 | 3 | 7 |
| F-doped DLC coating | 4 | 3 | 7 |

As can be seen in table 2 that it is possible to obtain similar and/better results using the inventive coatings compared to C6 based standard coating. This finding can be explained as follows; the physical modification promotes roll-off effect. PDMS-like-coating (i.e. pp-HMDSO) enhances to obtain good water repellency and fluorinated top coating is effective against oil, fat and milk.

Based on the invention it so possible to produce a polymeric fabric for a filtration media wherein the hydro- and oleophobic groups embedded onto the fabric have a stability and resistance to accelerated aging treatments according to ASTM F1980-16. Furthermore, the filtration media two step hydro- and oleophobic nanocoatings have excellent repellency against water and oil according to ISO 4920 and AATCC 118 respectively.

Based on the invention it is possible to provide a robust and reliable fabric having hydro- and oleophobic characteristics.

The invention claimed is:

1. A polymeric fabric comprising
a woven carrier layer;
an outer functional layer having hydrophobic and oleo-phobic characteristics made of a first compound; and
a second functional layer having hydrophobic character-istics made of a second compound,
wherein
the first and the second compound differ from each other,
the second functional layer is arranged on the woven carrier layer,
the outer functional layer is arranged on and at least partly coats the second functional layer such that the second functional layer is between the outer functional layer and the woven carrier layer, and
the outer functional layer is a plasma nanocoating which is comprises per- and polyfluoroalkyl substances (PFAS) comprising only one, two or three C-atoms.

2. The polymeric fabric according to claim 1,
wherein
the second functional layer has no oleophobic character-istics.

3. The polymeric fabric according to claim 1,
wherein
the plasma nanocoating further comprises perfluoropo-lyether compounds (PFPE).

4. The polymeric fabric according to claim 1,
wherein
the second functional layer is a plasma nanocoating which is based on hexamethyldisiloxane (HMDSO) or a dia-mond-like-carbon (DLC) layer.

5. The polymeric fabric according to claim 1,
wherein
the outer functional layer and/or the second functional layer is/are deposited by means of low-pressure plasma coating technology.

6. The polymeric fabric according to claim 1,
wherein
the woven carrier layer is woven of a first and a second monofilament yarn, wherein the first and the second monofilament yarn are produced of the same or of different polymer materials.

7. The polymeric fabric according to claim 1,
wherein
the polymeric fabric comprises a composite membrane comprising at least the woven carrier layer and an electrospun membrane layer.

8. The polymeric fabric according to claim 1,
wherein
the ratio of the thickness of the second functional layer to the thickness of the outer functional layer is 2:1 or larger.

9. A method of producing the polymeric fabric according to claim 1,
wherein
an outer functional layer providing hydrophobic and oleophobic characteristics is deposited on the poly-meric fabric by means of low-pressure plasma coating technology, a second functional layer providing hydrophobic charac-teristics is deposited on the polymeric fabric by means of low-pressure plasma coating technology,
the outer functional layer and the second functional layer differ from each other,
the second functional layer is deposited on the polymeric fabric before the outer functional layer is deposited on the polymeric fabric, and
the outer functional layer at least partly coats the second layer.

10. The method according to claim 9,
wherein
prior to the deposition of the second functional layer a pre-treatment of the polymeric fabric is performed by means of low pressure plasma technology using argon, helium, nitrogen, oxygen, and tetrafluo-romethane gases and/or a gaseous mixture thereof.

11. The method according to claim 9,
wherein
prior to the deposition of the second functional layer a two-step pre-treatment of polymeric fabric is per-formed,
in a first step the polymeric fabric is coated with UV curable imprint resin using gravure and/or slot die coating method, and
in a second step a surface patterning is performed using UV imprinting and/or hot embossing method.

12. The method according to claim 9,
wherein
prior to the deposition of the second functional layer a pre-treatment of the polymeric fabric is performed, and
the polymeric fabric is treated with an aqueous solution comprising sodium hydroxide (NaOH).

13. The method according to claim 9,
wherein
the outer functional layer and/or second functional layer is/are deposited in one processing step in one process to obtain fluorine-doped HMDSO plasma nanocoating and/or fluorine-doped DLC plasma nanocoating.

14. An apparatus for producing the polymeric fabric according to claim 1,
comprising a low-pressure plasma coating device being adapted to:
deposit an outer functional layer on the polymeric fabric providing hydrophobic and oleophobic characteristics by means of low-pressure plasma coating technology,
deposit a second functional layer on the polymeric fabric providing hydrophobic characteristics by means of low-pressure plasma coating technology, wherein the outer functional layer and the second functional layer differ from each other, and
first deposit the second functional layer on the polymeric fabric and then deposit the outer functional layer on the polymeric fabric, wherein the outer functional layer at least partly coats the second layer.

* * * * *